(12) United States Patent
Sakata et al.

(10) Patent No.: US 6,936,313 B2
(45) Date of Patent: Aug. 30, 2005

(54) RESIN SHEETS CONTAINING DISPERSED PARTICLES, PROCESSES FOR PRODUCING THE SAME, AND LIQUID CRYSTAL DISPLAYS

(75) Inventors: Yoshimasa Sakata, Ibaraki (JP);
Toshiyuki Umehara, Ibaraki (JP);
Kiichi Shimodaira, Ibaraki (JP);
Kazutaka Hara, Ibaraki (JP);
Yoshihiro Kitamura, Ibaraki (JP);
Katsuhiro Nakano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 93 days.

(21) Appl. No.: 10/090,166

(22) Filed: Mar. 5, 2002

(65) Prior Publication Data

US 2002/0160127 A1 Oct. 31, 2002

(30) Foreign Application Priority Data

| Mar. 7, 2001 | (JP) | P.2001-062845 |
| Mar. 7, 2001 | (JP) | P.2001-063032 |
| Mar. 7, 2001 | (JP) | P.2001-063369 |
| Oct. 29, 2001 | (JP) | P.2001-330088 |

(51) Int. Cl.$^7$ .......................................... G02F 1/13363
(52) U.S. Cl. .................. 428/1.53; 428/1.33; 428/1.53; 428/1.62; 349/92; 349/93; 349/112; 349/113; 349/117; 349/64; 359/599
(58) Field of Search ............................ 428/1.33, 1.53, 428/1.62; 349/112–113, 117, 92–93, 64, 86; 359/599

(56) References Cited

U.S. PATENT DOCUMENTS 4,070,749 A * 1/1978 Misono et al. ............. 29/592.1
5,693,956 A * 12/1997 Shi et al. ..................... 257/40
5,909,314 A * 6/1999 Oka et al. ................... 359/582
6,091,469 A * 7/2000 Naito .......................... 349/113
6,818,263 B2 * 11/2004 Yagi et al. ................... 428/1.6

FOREIGN PATENT DOCUMENTS

| DE | 101 25 889 A1 | 12/2001 |
| EP | 1 118 461 A2 | 7/2001 |

OTHER PUBLICATIONS

English Machine Translation of JP 2000–267086.*
English Machine Translation of JP 2000–275407.*
Derwent Abstract, JP 2002–234111.*
Patent Abstracts of Japan—2000275407 (Oct. 6, 2000).
Patent Abstracts of Japan—2000105305 (Apr. 11, 2000).
Patent Abstracts of Japan—11333869 (Dec. 7, 1999).
Patent Abstracts of Japan—2000267086 (Sep. 29, 2000).
European Search Report Dated Jun. 17, 2002.

* cited by examiner

Primary Examiner—Harold Pyon
Assistant Examiner—Sow-Fun Hon
(74) Attorney, Agent, or Firm—Sughrue Mion, PLLC

(57) ABSTRACT

A resin sheet containing dispersed particles which is thin, lightweight, and has excellent mechanical strength and light-diffusing properties. The resin sheets may be used in liquid crystal displays. A resin sheet having a hard coat layer, an epoxy resin layer containing 100 parts by weight of the resin to 200 parts by weight of a diffuser having a refractive index different from that of the epoxy resin and having an average particle diameter from 0.2 to 100 $\mu$m, and a thin metal layer as a reflecting layer, wherein the diffuser localizes so as to have a concentration distribution in the direction of the thickness of the epoxy resin layer. A resin sheet having dispersed particles which is obtained by superposing a reflecting layer, an inorganic gas barrier layer, or a color filter layer thereon. A process for producing the resin sheet having a color filter layer.

20 Claims, 3 Drawing Sheets

RESIN SHEETS CONTAINING DISPERSED PARTICLES, PROCESSES FOR PRODUCING THE SAME, AND LIQUID CRYSTAL DISPLAYS

FIELD OF THE INVENTION

The present invention relates to a resin sheet which has a base layer containing particles dispersed therein, is thin and lightweight, and has excellent mechanical strength and light-diffusing properties, a resin sheet containing dispersed particles which is obtained by superposing a reflecting layer or an inorganic gas barrier layer on that resin sheet, a resin sheet containing dispersed particles which is obtained by superposing a color filter layer on that resin sheet containing dispersed particles, processes for producing the resin sheet containing dispersed particles which has a color filer layer, and liquid crystal displays using those resin sheets containing dispersed particles.

DESCRIPTION OF THE RELATED ART

Recently, the demand for small portable information terminals is increasing with the progress in satellite communication and in the technology of mobile communication. The displays mounted on many of such small portable information terminals are required to be thin, and the most frequently used of these displays are liquid crystal displays.

The displays for use in small portable information terminals are further required to be reduced in power consumption and be highly visible when externally illuminated. Because of this, reflective liquid crystal displays are more frequently used than transmission liquid crystal displays. Since glass substrates for reflective liquid crystal cells have poor impact resistance and are considerably heavy, investigations are being made on plastic substrates for reflective liquid crystal cells.

However, plastic substrate for liquid crystal cells have poor gas barrier properties, so that the liquid crystal cells employing a plastic substrate have had the following problems. Water vapor and oxygen permeate through the substrate of the liquid crystal cell and enter the cell to break the transparent electrode film pattern. Furthermore, the water vapor and oxygen which have entered the cell accumulate to form bubbles and thereby arouse troubles such as appearance failures and alteration of the liquid crystal.

In the field of displays such as liquid crystal displays, a technique has been known which comprises applying a light-diffusing sheet containing transparent particles to the viewing side of a liquid crystal cell to prevent glitter attributable to illumination or the built-in backlight and thereby improve visibility. However, from the standpoint of reducing the thickness and weight of liquid crystal displays, investigations are being made on the impartation of a light-diffusing function to a liquid crystal cell substrate in place of the application of a light-diffusing sheet to the viewing side of a liquid crystal cell.

Furthermore, with the trend toward diversification of displays, liquid crystal cell substrates also are increasingly required to have colors. In related-art processes, a liquid crystal cell substrate having a color filter has been produced by forming a hard coat layer on a substrate through coating by flow casting, casting, or the like, subsequently successively forming a gas barrier layer and a base layer thereon, peeling the resultant multilayered resin structure from the substrate, and then forming a color filter layer on the base layer by successively forming, e.g., R, G, B, and BM patterns. However, this related-art technique has the following drawback. The multilayer structure comprising a hard coat layer, gas barrier layer, and base layer undergoes considerable dimensional changes due to moisture absorption and other factors, making it extremely difficult to conduct positioning in pattern-wise forming the color filter layer. Moreover, since the color filter layer is an outermost layer and has surface recesses and protrusions due to the patterns of, e.g., R, G, B, and BM, it is necessary to form a topcoat layer made of an acrylic resin, urethane resin, epoxy resin, polyimide resin, or the like.

Known examples of methods for forming a color filter include: a dyeing process in which dyeable media formed by photolithography are dyed; a pigment dispersion process in which pigmented photosensitive compositions are used; an electrodeposition method in which a patterned electrode is used; the printing method, which is a low cost process; and the ink-jet method in which colored areas are formed with an ink-jet apparatus.

SUMMARY OF THE INVENTION

One object of the invention is to provide a resin sheet containing dispersed particles, which has abase layer containing particles dispersed therein, is thin and lightweight, and is excellent in mechanical strength and light-diffusing property.

Another object of the invention is to provide a resin sheet containing dispersed particles, which is obtained by superposing a reflecting layer or an inorganic gas barrier layer on that resin sheet containing dispersed particles.

Still another object of the invention is to provide a resin sheet containing dispersed particles which is obtained by superposing a color filter layer on that resin sheet containing dispersed particles and to provide a process for producing this resin sheet.

A further object of the invention is to provide liquid crystal displays employing those resin sheets containing dispersed particles.

The invention provides a resin sheet containing dispersed particles, which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 $\mu$m, and a reflecting layer comprising a thin metal layer, wherein the diffuser localizes so as to have a concentration distribution in the direction of the thickness of the epoxy resin layer. The epoxy resin layer preferably consists of a single layer or is composed of superposed layers comprising a diffuser-containing layer and a diffuser-free layer adhered thereto. When the resin sheet containing dispersed particles is one in which the epoxy resin layer is an outermost layer and the diffuser localizes on the outermost side of the epoxy resin layer, then the outermost-side surface of the epoxy resin layer is preferably smooth. The difference in refractive index between the diffuser and the epoxy resin is preferably from 0.03 to 0.10. This resin sheet containing dispersed particles of the invention preferably has an oxygen permeability of 0.3 cc/m$^2$·24 h·atm or lower.

The invention further provides a liquid crystal display which employs the resin sheet containing dispersed particles described above.

The invention still further provides a resin sheet containing dispersed particles which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, and an inorganic gas barrier layer, wherein the diffuser localizes so as to have a concentration distribution in the direction of the thickness of the epoxy resin layer. The epoxy resin layer preferably consists of a single layer or is composed of superposed layers comprising a diffuser-containing layer and a diffuser-free layer adhered thereto. When the resin sheet containing dispersed particles is one in which the epoxy resin layer is an outermost layer and the diffuser localizes on the outermost side of the epoxy resin layer, then the outermost-side surface of the epoxy resin layer is preferably smooth. The difference in refractive index between the diffuser and the epoxy resin is preferably from 0.03 to 0.10. The inorganic gas barrier layer preferably comprises a silicon oxide in which the ratio of the number of oxygen atoms to that of silicon atoms is from 1.5 to 2.0, or the inorganic gas barrier layer preferably comprises a silicon nitride in which the ratio of the number of nitrogen atoms to that of silicon atoms is from 1.0 to 4/3. The inorganic gas barrier layer preferably has a thickness of from 5 to 200 nm. The resin sheet containing dispersed particles preferably has a moisture permeability of 10 $g/m^2 \cdot 24$ h·atm or lower.

The invention further provides a liquid crystal display which employs the resin sheet containing dispersed particles described above.

The invention furthermore provides a resin sheet containing dispersed particles which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, a gas barrier layer, and a color filter layer, wherein the diffuser localizes so as to have a concentration distribution in the direction of the thickness of the epoxy resin layer. The epoxy resin layer preferably consists of a single layer or is composed of superposed layers comprising a diffuser-containing layer and a diffuser-free layer adherent thereto. When the resin sheet containing dispersed particles is one in which the epoxy resin layer is an outermost layer and the diffuser localizes on the outermost side of the epoxy resin layer, then the outermost-side surface of the epoxy resin layer is preferably smooth. The difference in refractive index between the diffuser and the epoxy resin is preferably from 0.03 to 0.10.

The invention furthermore provides a process for producing a resin sheet containing dispersed particles which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, a gas barrier layer, and a color filter layer, wherein the diffuser localizes so as to have a concentration distribution in the direction of the thickness of the epoxy resin layer, the process comprising the steps of successively superposing a color filter layer, a gas barrier layer, and the epoxy resin layer in this order on a substrate coated with a hard coat layer.

The invention furthermore provides a process for producing a resin sheet containing dispersed particles which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, a gas barrier layer, and a color filter layer, wherein the diffuser localizes so as to have a concentration distribution in the direction of the thickness of the epoxy resin layer, the process comprising the steps of successively superposing a gas barrier layer, a color filter layer, and the epoxy resin layer in this order on a substrate coated with a hard coat layer.

In the invention, the processes preferably include the step of superposing the color filter layer by ink-jet printing in a flow casting process.

The substrate preferably has a surface roughness (Ra) of 10 nm or lower. The substrate preferably has an A1/A0 ratio of from 1 to 1.00003, provided that A0 is the distance between two points on the substrate as measured at 25° C. and 20% RH and A1 is the distance between the two points as measured at 25° C. and 80% RH.

The invention further provides a liquid crystal display which employs the resin sheet containing dispersed particles which has a color filter.

BRIEF DESCRIPTION OF THE DRAWINGS

The foregoing and other objects and advantages of the invention will be apparent from the following detailed description and the accompanying drawings, in which.

DETAILED DESCRIPTION OF THE INVENTION

Figure 1:
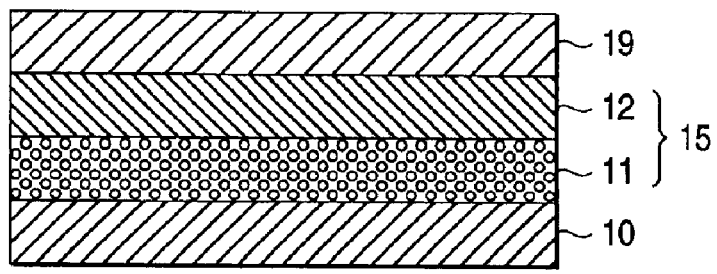
FIG. 1 is a sectional view of one embodiment of the resin sheets containing dispersed particles according to the invention.
Figure 2:
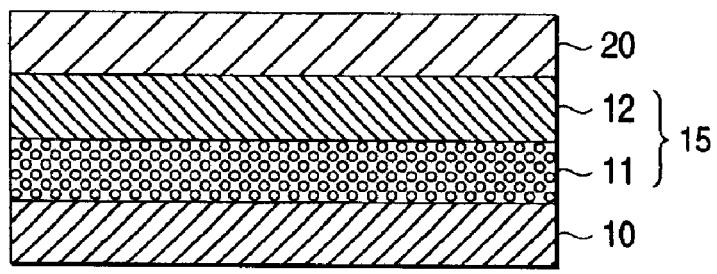
FIG. 2 is a sectional view of another embodiment of the resin sheets containing dispersed particles according to the invention.
Figure 3:
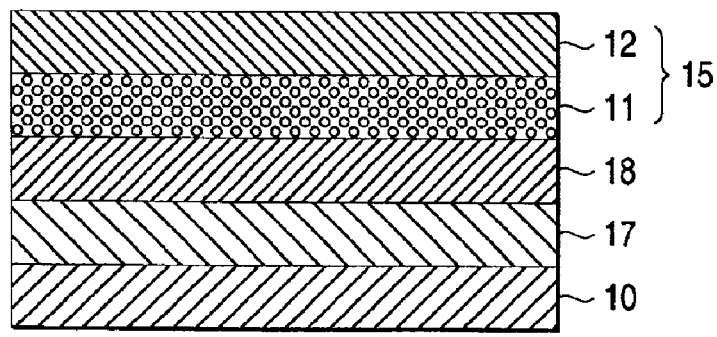
FIG. 3 is a sectional view of still another embodiment of the resin sheets containing dispersed particles according to the invention.

The resin sheet containing dispersed particles according to one aspect of the invention comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, and a reflecting layer comprising a thin metal layer, wherein the diffuser localizes so as to have a concentration distribution in the direction of the thickness of the epoxy resin layer.

In the invention, the reflecting layer need not be an outermost layer. Namely, the resin sheet provided by the invention in this aspect is either a multilayer structure comprising a hard coat layer, an epoxy resin layer, and a reflecting layer in this order from an outermost side or a multilayer structure comprising a hard coat layer, a reflecting layer, and an epoxy resin layer in this order from an outermost side.

Examples of materials usable for forming the hard coat layer in this invention include urethane resins, acrylic resins, polyester resins, poly(vinylalcohol) resins such as poly(vinyl alcohol) and ethylene/vinyl alcohol copolymers, vinyl chloride resins, and vinylidene chloride resins.

Also usable for forming the hard coat layer are polyarylate resins, sulfone resins, amide resins, imide resins, polyethersulfone resins, polyetherimide resins, polycarbonate resins, silicone resins, fluororesins, polyolefin resins, styrene resins, vinylpyrrolidone resins, cellulose resins, acrylonitrile resins, and the like. Preferred of these resins are urethane resins, in particular, a urethane acrylate. An appropriate blend or the like of two or more resins can also be used for forming the hard coat layer.

Examples of the epoxy resin for use in the invention include the bisphenol types such as bisphenol A, bisphenol F, and bisphenol S types and hydrogenated epoxy resins derived from these, the novolac types such as phenol-novolac and cresol-novolac types, the nitrogen-containing cyclic types such as triglycidyl isocyanurate and hydantoin types, the alicyclic type, the aliphatic type, the aromatic types such as naphthalene type, the glycidyl ether type, the low water absorption types such as biphenyl type, the dicyclo type, the ester type, the etherester type, and modifications of these. These resins may be used alone or in combination of two or more thereof. Preferred of those various epoxy resins from the standpoints of discoloration prevention etc. are bisphenol A epoxy resins, alicyclic epoxy resins, and triglycidyl isocyanurate type epoxy resins.

From the standpoint of obtaining a resin sheet satisfactory in flexibility, strength, and other properties, it is generally preferred to use such an epoxy resin which has an epoxy equivalent of from 100 to 1,000 and gives a cured resin having a softening point of 120° C. or lower. From the standpoint of obtaining an epoxy resin liquid excellent in applicability, spreadability into sheet, etc., it is preferred to use a two-pack type resin which is liquid at temperatures not higher than the application temperature, in particular at room temperature.

A hardener and a hardening accelerator can be suitably incorporated into the epoxy resins. Furthermore, various known additives used hitherto, such as an antioxidant, modifier, surfactant, dye, pigment, discoloration inhibitor and ultraviolet absorber, can be suitably incorporated according to need.

The hardener is not particularly limited, and one or more suitable hardeners can be used according to the epoxy resin to be used. Examples thereof include organic acid compounds such as tetrahydrophthalic acid, methyltetrahydrophthalic acid, hexahydrophthalic acid, and methylhexahydrophthalic acid and amine compounds such as ethylenediamine, propylenediamine, diethylenetriamine, triethylenetetramine, amine adducts of these, m-phenylenediamine, diaminodiphenylmethane, and diaminodiphenyl sulfone.

Other examples of the hardener include amide compounds such as dicyandiamide and polyamides, hydrazide compounds such as dihydrazide, and imidazole compounds such as methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the hardener further include imidazoline compounds such as methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline, and further include phenol compounds, urea compounds, and polysulfide compounds.

Acid anhydride compounds also are included in examples of the hardener. Such acid anhydride hardeners can be advantageously used from the standpoints of discoloration prevention, etc. Examples thereof include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride, and chlorendic anhydride.

Especially preferred are acid anhydride hardeners which are colorless to light yellow and have a molecular weight of about from 140 to 200, such as phthalic anhydride, tetrahydrophthalic anhydride, hexahydrophthalic anhydride, and methylhexahydrophthalic anhydride.

In the case where an acid anhydride is used as a hardener, an epoxy resin and this hardener are mixed in such a proportion that the amount of the acid anhydride is preferably from 0.5 to 1.5 equivalents, more preferably from 0.7 to 1.2 equivalents, per equivalent of the epoxy groups of the epoxy resin. In case where the acid anhydride is used in an amount smaller than 0.5 equivalents, the cured resin tends to have an impaired hue. In case where the acid anhydride is used in an amount exceeding 1.5 equivalents, the cured resin tends to have reduced moisture resistance. When one or more other hardeners are used, the range of the amount thereof to be used may be the same as in the case described above.

Examples of the hardening accelerator include tertiary amines, imidazole compounds, quaternary ammonium salts, organic metal salts, phosphorus compounds, and urea compounds. Especially preferred of these are tertiary amines, imidazole compounds, and phosphorus compounds. These compounds can be used alone or in combination of two or more thereof.

The amount of the hardening accelerator to be incorporated is preferably from 0.05 to 7.0 parts by weight, more preferably from 0.2 to 3.0 parts by weight, per 100 parts by weight of the epoxy resin. In case where the amount of the hardening accelerator incorporated is smaller than 0.05 parts by weight, a sufficient hardening-accelerating effect cannot be obtained. In case where the amount thereof exceeds 7.0 parts by weight, there is a possibility that the cured resin might discolor.

Examples of the antioxidant include known antioxidants such as phenol compounds, amine compounds, organosulfur compounds, and phosphine compounds.

Examples of the modifier include known modifiers such as glycols, silicones, and alcohols.

The surfactant is added for the purpose of obtaining an epoxy resin sheet having a smooth surface when the epoxy resin is formed into a sheet by flow casting and cured while in contact with air. Examples of the surfactant include silicone, acrylic, and fluorochemical surfactants. Especially preferred are silicone surfactants.

A diffuser having a refractive index different from that of the epoxy resin should be incorporated into the epoxy resin layer in the invention in order to impart light-diffusing properties. The difference in refractive index between the diffuser and the epoxy resin is preferably from 0.03 to 0.10. In case where the difference in refractive index is smaller than 0.03 or larger than 0.10, a sufficient light-diffusing function cannot be imparted.

Examples of the diffuser include inorganic particles comprising, e.g., a silicon compound, alumina, titania, zirconia, tin oxide, indium oxide, cadmium oxide, or antimony oxide, organic particles comprising, e.g., an acrylic resin or melamine resin, and particles comprising the inorganic particles coated with the organic particles. Bubbles incorporated into an epoxy resin coating liquid by an appropriate technique, e.g., stirring, can also be used as a diffuser-forming material.

The particle diameter of the diffuser-forming material can be suitably determined. However, from the standpoint of obtaining sufficient light-diffusing properties, the average particle diameter of the diffuser is generally from 0.2 to 100 $\mu$m, preferably from 0.5 to 50 $\mu$m, more preferably from 1 to 20 $\mu$m.

The amount of the diffuser-forming material to be used also can be suitably determined according to the desired degree of light-diffusing properties or other factors. However, the amount of the diffuser consisting of transparent particles is generally up to 200 parts by weight, preferably from 0.05 to 150 parts by weight, more preferably from 0.1 to 50 parts by weight, per 100 parts by weight of the epoxy resin. In the case where bubbles and the like are included in the diffuser, the amount of the diffuser is generally up to 80% by volume, preferably from 2 to 60% by volume, more preferably from 5 to 50% by volume, based on the diffuser-containing side of the layer or on the diffuser-containing layer.

For imparting sufficient light-diffusing properties, the diffuser in the invention should localize so as to have a concentration distribution in the direction of the thickness of the epoxy resin layer. The localization enables the diffuser to be distributed only in a region close to a liquid crystal layer, whereby a light-diffusing function can be imparted to improve visibility.

The term "localize" used for the diffuser in the invention means that when the epoxy resin layer is divided into two equal-volume parts along a plane perpendicular to the thickness direction, the proportion by volume of the diffuser in one of the two resultant epoxy resin layers is at least two times, preferably at least 3 times, more preferably at least 5 times, the proportion by volume of the diffuser in the other epoxy resin layer. The term "proportion by volume" is (volume of the diffuser)/(volume of the epoxy resin layer containing the diffuser).

Examples of methods for causing the diffuser to localize so as to have a concentration distribution in the direction of the thickness of the epoxy resin layer include a method in which an epoxy resin coating liquid is spread into a sheet-form layer and the diffuser is allowed to sediment or float based on a difference in specific gravity. The epoxy resin layer formed by this method consists of a single layer, in which the diffuser is contained on one side thereof and is not contained on the other side.

Alternatively, use may be made of a method which comprises applying an epoxy resin coating liquid containing no diffuser, bringing the coating into a semi-cured state, subsequently applying thereto an epoxy resin coating liquid containing a diffuser, and then completely curing the two coating layers to thereby cause the diffuser to localize. The epoxy resin layer formed by this method comprises superposed layers adhered to each other, i.e., a diffuser-containing layer and a diffuser-free layer. In this case, the sequence of application of the epoxy resin coating liquid containing no diffuser and the epoxy resin coating liquid containing a diffuser may be reversed. When superposed layers are formed by this method, in which the layer spread first is brought into a semi-cured state and the other layer is subsequently spread and superposed thereon, then the diffuser can be inhibited or prevented from coming into the other spread layer.

As long as the diffuser localizes in a state within the scope specified above, the epoxy resin layer may be composed of two layers each formed from a diffuser-containing epoxy resin coating liquid.

In the case where the epoxy resin layer in the invention is an outermost layer and the diffuser is present on the outermost side of the epoxy resin layer, then the outermost-side surface of the epoxy resin layer is preferably smooth. The term "smooth" as used herein means that the surface roughness (Ra) is 1 nm or lower. The smooth surface of the epoxy resin layer facilitates formation of an alignment film, transparent electrode, etc.

The reflecting layer in the invention should comprise a thin metal layer. Silver or aluminum is preferably used as the material of the thin metal layer. The reflecting layer has a gas barrier function and prevents water vapor and oxygen from penetrating into the cell through the liquid crystal cell substrate. Consequently, in this invention, there is no need of superposing an organic gas barrier layer comprising poly (vinyl alcohol) or the like or an inorganic gas barrier layer made of silicon oxide or the like.

The reflecting layer can be formed, for example, by vapor deposition.

The thickness of the reflecting layer is preferably from 50 to 1,000 nm, more preferably from 100 to 500 nm. Thicknesses of the reflecting layer smaller than 50 nm result in reduced reliability with respect to heat resistance, moisture resistance, etc. Thicknesses thereof exceeding 1,000 nm are apt to result in cracking and lead to an increased cost. Furthermore, formation of such too thick a reflecting layer makes the resin sheet unusable in a transmission liquid crystal display.

The oxygen permeability of the resin sheet containing dispersed particles of the invention is preferably 0.3 cc/m$^2$·24 h·atm or lower. More preferably, the oxygen permeability of the liquid crystal cell substrate is 0.15 cc/m$^2$·24 h·atm or lower. In case where the oxygen permeability thereof exceeds 0.3 cc/m$^2$·24 h·atm, use of this resin sheet poses problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

In fabricating a liquid crystal cell from a liquid crystal cell substrate, a burning step for alignment film formation and a sealant burning step are conducted at about 150° C. and sputtering for forming a transparent electrode comprising, e.g., ITO is conducted at about 180° C. In order for the liquid crystal cell substrate according to the invention to retain quality reliability in these steps, it preferably has a heat resistance of 200° C. or higher.

The resin sheet containing dispersed particles of the invention preferably has a yellowness index change, as calculated from the yellowness index thereof determined after 30 minutes heating at 200° C. and the yellowness index thereof determined at room temperature, of 0.75 or lower. The yellowness index change of the resin sheet can be calculated using the following equation (1), wherein YI is the yellowness index of the sheet determined at room temperature and $YI_{200}$ is the yellowness index of the sheet determined after 30 minutes heating at 200° C. In case where the yellowness index change of the resin sheet exceeds 0.75, use of this resin sheet as a liquid crystal cell substrate in fabricating a liquid crystal display may result in impaired display quality, for example, a white picture having a yellowish tint.

$$\Delta YI = \frac{(YI_{200} - YI)}{YI} \quad \text{Equation (1)}$$

An electrode may be formed on the resin sheet containing dispersed particles of this invention. Thus, an electrode-bearing resin sheet containing dispersed particles can be provided.

The electrode is preferably a transparent electrode film. The transparent electrode film can be formed from an appropriate material by a film deposition or coating technique used hitherto, such as vapor deposition, sputtering, or coating. Examples of the electrode material include indium oxide, tin oxide, indium-tin mixed oxide, gold, platinum, palladium, and transparent conductive coating materials. A transparent conductive film of a given electrode pattern can be directly formed. An alignment film for liquid crystal alignment may be optionally formed on the transparent conductive film by a technique used hitherto.

A liquid crystal display is generally fabricated, for example, by suitably assembling components including a polarizing film, a liquid crystal cell, a reflector or backlight, and optional optical parts and integrating an operating circuit into the assembly. In the invention, a liquid crystal display can be fabricated according to a procedure used hitherto without particular limitations, except that the resin sheet containing dispersed particles described above is used. Consequently, appropriate optical parts can be suitably used in combination with the resin sheet containing dispersed particles in fabricating the liquid crystal display according to the invention. For example, an antiglare layer, antireflection film, protective layer, or protective plate may be disposed over a viewing-side polarizing film. Furthermore, a retardation film for compensation may be interposed between the liquid crystal cell and the viewing-side polarizing film. From the standpoint of inhibiting or preventing viewing angle defects and shading, the resin sheet is more preferably disposed so that the diffuser-containing side or the diffuser-containing layer faces the inner side of the cell.

The resin sheet containing dispersed particles according to another aspect of the invention comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, and an inorganic gas barrier layer, wherein the diffuser localizes so as to have a concentration distribution in the direction of the thickness of the epoxy resin layer.

Preferred examples of resins usable for forming the hard coat layer include urethane resins. A urethane acrylate is especially preferred.

The epoxy resin is preferably a bisphenol A epoxy resin, alicyclic epoxy resin, or triglycidyl isocyanurate type epoxy resin from the standpoints of discoloration prevention and others.

A hardener and a hardening accelerator can be suitably incorporated into the epoxy resin. Furthermore, various known additives used hitherto, such as an antioxidant, modifier, surfactant, dye, pigment, discoloration inhibitor, and ultraviolet absorber, can be suitably incorporated according to need.

In this resin sheet containing dispersed particles of the invention, which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, and an inorganic gas barrier layer, the diffuser having a refractive index different from that of the epoxy resin is indispensable to the epoxy resin layer so as to impart light-diffusing properties. The difference in refractive index between the diffuser and the epoxy resin is preferably from 0.03 to 0.10. In case where the difference in refractive index is smaller than 0.03 or larger than 0.10, a sufficient light-diffusing function cannot be imparted.

Examples of the diffuser include inorganic particles comprising, e.g., a silicon compound, alumina, titania, zirconia, tin oxide, indium oxide, cadmium oxide, or antimony oxide, organic particles comprising, e.g., an acrylic resin or melamine resin, and particles comprising the inorganic particles coated with the organic particles. Bubbles incorporated into an epoxy resin coating liquid by an appropriate technique, e.g., stirring, can also be used as a diffuser-forming material.

The particle diameter of the diffuser-forming material can be suitably determined. However, from the standpoint of obtaining sufficient light-diffusing properties, the average particle diameter of the diffuser is generally from 0.2 to 100 μm, preferably from 0.5 to 50 μm, more preferably from 1 to 20 μm.

The amount of the diffuser-forming material to be used also can be suitably determined according to the desired degree of light-diffusing properties or other factors. However, the amount of the diffuser consisting of transparent particles is generally up to 200 parts by weight, preferably from 0.05 to 150 parts by weight, more preferably from 0.1 to 50 parts by weight, per 100 parts by weight of the epoxy resin. In the case where bubbles and the like are included in the diffuser, the amount of the diffuser is generally up to 80% by volume, preferably from 2 to 60% by volume, more preferably from 5 to 50% by volume, based on the diffuser-containing side of the layer or on the diffuser-containing layer.

For imparting sufficient light-diffusing properties, the diffuser in the invention should localize so as to have a concentration distribution in the direction of the thickness of the epoxy resin layer. The localization enables the diffuser to be distributed only in a region close to a liquid crystal layer, whereby a light-diffusing function can be imparted to improve visibility.

Examples of methods for causing the diffuser to localize so as to have a concentration distribution in the direction of the thickness of the epoxy resin layer include a method in which an epoxy resin coating liquid is spread into a sheet-form layer and the diffuser is allowed to sediment or float based on a difference in specific gravity. The epoxy resin layer formed by this method consists of a single layer, in which the diffuser is contained on one side thereof and is not contained on the other side.

Alternatively, a method may be used which comprises applying an epoxy resin coating liquid containing no diffuser, bringing the coating into a semi-cured state, subsequently applying thereto an epoxy resin coating liquid containing a diffuser, and then completely curing the two coating layers to thereby cause the diffuser to localize. The epoxy resin layer formed by this method is composed of superposed layers adherent to each other, i.e., a diffuser-containing layer and a diffuser-free layer. In this case, the sequence of application of the epoxy resin coating liquid containing no diffuser and the epoxy resin coating liquid containing a diffuser may be reversed. When superposed layers are formed by this method, in which the layer spread first is brought into a semi-cured state and the other layer is subsequently spread and superposed thereon, then the diffuser can be inhibited or prevented from coming into the other spread layer.

As long as the diffuser localizes in a state within the scope specified above, the epoxy resin layer may be composed of two layers each formed from a diffuser-containing epoxy resin coating liquid.

In the case where the epoxy resin layer in the invention is an outermost layer and the diffuser is present on the outermost side of the epoxy resin layer, then the outermost-side surface of the epoxy resin layer is preferably smooth. The term "smooth" as used herein means that the surface roughness (Ra) is 1 nm or lower. The smooth surface of the epoxy resin layer facilitates formation of an alignment film, transparent electrode, etc.

Examples of materials usable for forming the inorganic gas barrier layer in the invention include known transparent gas barrier materials such as a silicon oxide, magnesium oxide, aluminum oxide, and zinc oxide. However, a silicon oxide is preferred from the standpoints of gas barrier properties, adhesion to the base layer, etc.

The silicon oxide is preferably one in which the ratio of the number of oxygen atoms to the number of silicon atoms is from 1.5 to 2.0, from the standpoints of the gas barrier properties, transparency, surface smoothness, flexibility, film stress, and cost of the inorganic gas barrier layer, etc. In case where the ratio of the number of oxygen atoms to that of silicon atoms is lower than 1.5, flexibility and transparency are impaired. In silicon oxides, the maximum value of the ratio of the number of oxygen atoms to that of silicon atoms is 2.0.

A silicon nitride also is a preferred material for forming the inorganic gas barrier layer. The silicon nitride is preferably one in which the ratio of the number of nitrogen atoms to the number of silicon atoms is from 1.0 to 4/3, from the standpoints of the gas barrier properties, transparency, surface smoothness, flexibility, film stress, and cost of the inorganic gas barrier layer, etc. In silicon nitrides, the maximum value of the ratio of the number of nitrogen atoms to that of silicon atoms is 4/3.

The thickness of the inorganic gas barrier layer in the invention is preferably from 5 to 200 nm. In case where the thickness of the inorganic gas barrier layer is smaller than 5 nm, satisfactory gas barrier properties cannot be obtained. Thicknesses of the inorganic gas barrier layer larger than 200 nm result in problems concerning transparency, flexibility, film stress, and cost.

The resin sheet containing dispersed particles of the invention described above which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 $\mu$m, and an inorganic gas barrier layer preferably has a moisture permeability of 10 g/m$^2$·24 h·atm or lower. In case where the moisture permeability thereof exceeds 10 g/m$^2$·24 h·atm, use of this resin sheet poses problems, for example, that water vapor and oxygen penetrate into the cell to break the transparent conductive film pattern and that the water vapor and oxygen which have entered the cell accumulate to form bubbles and thereby arouse troubles such as appearance failures and alteration of the liquid crystal.

The resin sheet containing dispersed particles of the invention described above which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 $\mu$m, and an inorganic gas barrier layer preferably has a yellowness index change, as calculated from the yellowness index thereof determined after 30 minutes heating at 200° C. and the yellowness index thereof determined at room temperature, of 0.75 or lower. The yellowness index change of the resin sheet can be calculated using equation (1) from YI, which is the yellowness index of the sheet determined at room temperature, and YI$_{200}$, which is the yellowness index of the sheet determined after 30 minutes heating at 200° C. In case where the yellowness index change of the resin sheet exceeds 0.75, use of this resin sheet as a liquid crystal cell substrate in fabricating a liquid crystal display may result in impaired display quality, for example, a white picture having a yellowish tint.

An electrode maybe formed on this resin sheet containing dispersed particles. Thus, an electrode-bearing resin sheet containing dispersed particles can be provided.

The electrode is preferably a transparent electrode film. The transparent electrode film can be formed from an appropriate material by a film deposition or coating technique used hitherto, such as vapor deposition, sputtering, or coating. Examples of the electrode material include indium oxide, tin oxide, indium-tin mixed oxide, gold, platinum, palladium, and transparent conductive coating materials. A transparent conductive film of a given electrode pattern can be directly formed. An alignment film for liquid crystal alignment may be optionally formed on the transparent conductive film by a technique used hitherto.

A liquid crystal display is generally fabricated, for example, by suitably assembling components including a polarizing film, a liquid crystal cell, a reflector or backlight, and optional optical parts and integrating an operating circuit into the assembly. In the invention, a liquid crystal display can be fabricated according to a procedure used hitherto without particular limitations, except that use is made of the resin sheet containing dispersed particles which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 $\mu$m, and an inorganic gas barrier layer. Consequently, appropriate optical parts can be suitably used in combination with the resin sheet containing dispersed particles in fabricating the liquid crystal display according to the invention. For example, an antiglare layer, antireflection film, protective layer, or protective plate may be disposed over a viewing-side polarizing film. Furthermore, a retardation film for compensation may be interposed between the liquid crystal cell and the viewing-side polarizing film. From the standpoint of inhibiting or preventing viewing angle defects and shading, the resin sheet is more preferably disposed so that the diffuser-containing side or the diffuser-containing layer faces the inner side of the cell.

The resin sheet containing dispersed particles according to still another aspect of the invention comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, a gas barrier layer, and a color filter layer, wherein the diffuser localizes so as to have a concentration distribution in the direction of the thickness of the epoxy resin layer.

Preferred examples of resins usable for forming the hard coat layer include urethane resins. A urethane acrylate is especially preferred.

The epoxy resin is preferably a bisphenol A epoxy resin, alicyclic epoxy resin, or triglycidyl isocyanurate type epoxy resin from the standpoints of discoloration prevention and others.

A hardener and a hardening accelerator can be suitably incorporated into the epoxy resin. Furthermore, various known additives used hitherto, such as, e.g., an antioxidant, modifier, surfactant, dye, pigment, discoloration inhibitor, and ultraviolet absorber, can be suitably incorporated according to need.

In this resin sheet containing dispersed particles of the invention, which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, a gas barrier layer, and a color filter layer, the diffuser having a refractive index different from that of the epoxy resin is indispensable to the epoxy resin layer so as to impart light-diffusing properties. The difference in refractive index between the diffuser and the epoxy resin is preferably from 0.03 to 0.10. In case where the difference in refractive index is smaller than 0.03 or larger than 0.10, a sufficient light-diffusing function cannot be imparted.

Examples of the diffuser include inorganic particles made of, e.g., a silicon compound, alumina, titania, zirconia, tin oxide, indium oxide, cadmium oxide, or antimony oxide, organic particles made of, e.g., an acrylic resin or melamine resin, and particles comprising the inorganic particles coated with the organic particles. Bubbles incorporated into an epoxy resin coating liquid by an appropriate technique, e.g., stirring, can also be used as a diffuser-forming material.

The particle diameter of the diffuser-forming material can be suitably determined. However, from the standpoint of obtaining sufficient light-diffusing properties, the average particle diameter of the diffuser is generally from 0.2 to 100 μm, preferably from 0.5 to 50 μm, more preferably from 1 to 20 μm.

The amount of the diffuser-forming material to be used also can be suitably determined according to the desired degree of light-diffusing properties or other factors. However, the amount of the diffuser consisting of transparent particles is generally up to 200 parts by weight, preferably from 0.05 to 150 parts by weight, more preferably from 0.1 to 50 parts by weight, per 100 parts by weight of the epoxy resin. In the case where bubbles and the like are included in the diffuser, the amount of the diffuser is generally up to 80% by volume, preferably from 2 to 60% by volume, more preferably from 5 to 50% by volume, based on the diffuser-containing side of the layer or on the diffuser-containing layer.

For imparting sufficient light-diffusing properties, the diffuser in the invention should localize so as to have a concentration distribution in the direction of the thickness of the epoxy resin layer. The localization enables the diffuser to be distributed only in a region close to a liquid crystal layer, whereby a light-diffusing function can be imparted to improve visibility.

Examples of methods for causing the diffuser to localize so as to have a concentration distribution in the direction of the thickness of the epoxy resin layer include a method in which an epoxy resin coating liquid is spread into a sheet-form layer and the diffuser is allowed to sediment or float based on a difference in specific gravity. The epoxy resin layer formed by this method consists of a single layer, in which the diffuser is contained on one side thereof and is not contained on the other side.

Alternatively, use may be made of a method which comprises applying an epoxy resin coating liquid containing no diffuser, bringing the coating into a semi-cured state, subsequently applying thereto an epoxy resin coating liquid containing a diffuser, and then completely curing the two coating layers to thereby cause the diffuser to localize. The epoxy resin layer formed by this method is composed of superposed layers adherent to each other, i.e., a diffuser-containing layer and a diffuser-free layer. In this case, the sequence of application of the epoxy resin coating liquid containing no diffuser and the epoxy resin coating liquid containing a diffuser may be reversed. When superposed layers are formed by this method, in which the layer spread first is brought into a semi-cured state and the other layer is subsequently spread and superposed thereon, then the diffuser can be inhibited or prevented from coming into the other spread layer.

As long as the diffuser localizes in a state within the scope specified above, the epoxy resin layer may be composed of two layers each formed from a diffuser-containing epoxy resin coating liquid.

In the case where the epoxy resin layer in the invention is an outermost layer and the diffuser is present on the outermost side of the epoxy resin layer, then the outermost-side surface of the epoxy resin layer is preferably smooth. The term "smooth" as used herein means that the surface roughness (Ra) is 1 nm or lower. The smooth surface of the epoxy resin layer facilitates formation of an alignment film, transparent electrode, etc.

Examples of materials usable for forming the gas barrier layer in this resin sheet containing dispersed particles of the invention include organic materials having low oxygen permeability. Specific examples thereof include vinyl alcohol polymers such as poly(vinyl alcohol), partially saponified poly(vinyl alcohol)s, and ethylene/vinyl alcohol copolymers, polyacrylonitrile, and poly(vinylidene chloride). However, vinyl alcohol polymers are especially preferred from the standpoint of high gas barrier properties.

Such an organic gas barrier layer can be formed by spreading a solution of any of those polymers for use as gas barrier layer materials by an appropriate coating technique such as casting, spin coating, wire-wound bar coating, or extrusion coating and then drying the spread layer.

The thickness of the organic gas barrier layer is preferably from 2 to 10 μm, more preferably from 3 to 5 μm. In case where the thickness of the gas barrier layer is smaller than 2 μm, a sufficient gas barrier function cannot be imparted. In case where the thickness thereof exceeds 10 μm, the resin sheet yellows.

Besides the aforementioned organic gas barrier materials, examples of materials usable for forming the gas barrier layer in the resin sheet containing dispersed particles of the invention include transparent inorganic gas barrier materials such as a silicon oxide, magnesium oxide, aluminum oxide, and zinc oxide. A silicon oxide is preferred from the standpoints of gas barrier properties, adhesion to the base layer, etc.

The silicon oxide is preferably one in which the ratio of the number of oxygen atoms to the number of silicon atoms is from 1.5 to 2.0, from the standpoints of the gas barrier properties, transparency, surface smoothness, flexibility, film stress, and cost of the inorganic gas barrier layer, etc. In case where the ratio of the number of oxygen atoms to that of silicon atoms is lower than 1.5, flexibility and transparency are impaired. In silicon oxides, the maximum value of the ratio of the number of oxygen atoms to that of silicon atoms is 2.0.

A silicon nitride also is a preferred material for forming an inorganic gas barrier layer. The silicon nitride is preferably one in which the ratio of the number of nitrogen atoms to the number of silicon atoms is from 1.0 to 4/3, from the standpoints of the gas barrier properties, transparency, surface smoothness, flexibility, film stress, and cost of the inorganic gas barrier layer, etc. In silicon nitrides, the maximum value of the ratio of the number of nitrogen atoms to that of silicon atoms is 4/3.

The thickness of the inorganic gas barrier layer in the invention is preferably from 5 to 200 nm. In case where the thickness of the inorganic gas barrier layer is smaller than 5 nm, satisfactory gas barrier properties cannot be obtained. Thicknesses of the inorganic gas barrier layer larger than 200 nm result in problems concerning transparency, flexibility, film stress, and cost.

Preferred methods for forming the inorganic gas barrier layer include vapor deposition, sputtering, and plasma CVD.

The resin sheet containing dispersed particles of the invention which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 µm, a gas barrier layer, and a color filter layer preferably has the following values of yellowness index change from the standpoint of display quality. When the gas barrier layer is an organic gas barrier layer or an inorganic gas barrier layer, the yellowness index change of the resin sheet is preferably 1.00 or lower or 0.75 or lower, respectively.

The color filter layer in the resin sheet containing dispersed particles described above is formed by forming a black matrix (BM) and then forming patterns of red (R), green (G), and blue (B) pixels in given positions on the plane bearing the black matrix.

The process according to a further aspect of the invention, which is for producing a resin sheet containing dispersed particles which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 µm, a gas barrier layer, and a color filter layer and in which the diffuser localizes so as to have a concentration distribution in the direction of the thickness of the epoxy resin layer, comprises the steps of successively superposing a color filter layer, a gas barrier layer, and the epoxy resin layer in this order on a substrate coated with a hard coat layer.

In the process described above, the sequence of superposition of a color filter layer and a gas barrier layer may be reversed. Namely, a gas barrier layer, a color filter layer, and the epoxy resin layer may be successively superposed in this order on a substrate coated with a hard coat layer. This means that the process of the invention is characterized by not including a step in which a multilayer structure comprising, e.g., a hard coat layer, a gas barrier layer, and an epoxy resin layer is peeled off before a color filter layer is superposed thereon.

Examples of methods for forming a color filter layer in producing the resin sheet containing dispersed particles include a dyeing process, pigment dispersion process, electrodeposition method, printing methods, and ink-jet printing. However, ink-jet printing is preferred in that satisfactory production efficiency is obtained when it is used in combination with a flow casting process. Namely, it is preferred in this invention to superpose a color filter layer by ink-jet printing in a flow casting process.

The ink-jet printing is a technique in which an ink-jet apparatus is used to eject red, blue, and green inks from ink-jet nozzles to thereby form given patterns. This ink-jet printing is effective in improving the production efficiency because red, blue, and green inks can be simultaneously applied pattern-wise. In addition, when an ink-jet apparatus is installed in a production line for producing a resin sheet by flow casting, it becomes possible to produce a color filter-bearing resin sheet through a series of successive production steps including film formation by flow casting.

In the case where ink-jet printing is used for patterning, inks containing a colorant and a binder resin can be used. Preferred for use as the colorant are pigments and dyes which are excellent in heat resistance, light resistance, etc. Preferred for use as the binder resin are transparent resins having excellent heat resistance. Examples thereof include melamine resins and acrylic resins. However, the binder resin should not be construed as being limited to these examples.

The substrate to be used in the invention preferably is a material which has satisfactory surface smoothness and dimensionally changes little with ambient conditions such as temperature and humidity. Examples of the material include glass plates and metal sheets or plates. The substrate is preferably in the form of a plate, endless belt, or the like. The surface roughness (Ra) of the substrate is preferably 10 nm or lower. In case where the substrate has a surface roughness (Ra) higher than 10 nm, a resin sheet having a mirror surface cannot be obtained.

The substrate to be used in the invention preferably has an A1/A0 ratio of from 1 to 1.00003, provided that A0 is the distance between two points on the substrate as measured at 25° C. and 20% RH and A1 is the distance between the two points as measured at 25° C. and 80% RH. In case where the ratio A1/A0, which indicates a change in the distance between two points, is lower than 1 or higher than 1.00003, position shifting occurs when a color filter layer is superposed by forming patterns of, e.g., R, G, B, and BM on the substrate coated with a hard coat layer. The term "A1/A0 is 1 or higher" as used herein means that A1/A0 is 1.00000 or higher.

In the most preferred embodiment of the process of the invention for producing the color filter-bearing resin sheet containing dispersed particles, the process includes the step of superposing a color filter layer by ink-jet printing in a flow casting process, and the substrate to be coated by flow casting has a surface roughness (Ra) of 10 nm or lower and has an A1/A0 ratio of from 1 to 1.00003, provided that A0 is the distance between two points on the substrate as measured at 25° C. and 20% RH and A1 is the distance between the two points as measured at 25° C. and 80% RH.

The substrate is, for example, one which has a mark-off line scribed along the running direction for the substrate, i.e., in a direction parallel to an edge of the substrate. Meanders of the substrate are detected by a sensor based on that mark-off line to operate the ink-jet apparatus so that the ink-jet nozzles follow the positional fluctuations of the substrate. Thus, patterning for color filter layer formation can be precisely conducted in this invention.

The process of the invention for producing the color filter-bearing resin sheet, which comprises a hard coat layer, an epoxy resin layer comprising 100 parts by weight of an epoxy resin and up to 200 parts by weight of a diffuser having a refractive index different from that of the epoxy resin and having an average particle diameter of from 0.2 to 100 μm, a gas barrier layer, and a color filter layer and in which the diffuser localizes so as to have a concentration distribution in the direction of the thickness of the epoxy resin layer, can be simplified by printing a color filter layer on a gas barrier layer. Namely, the gas barrier layer is used also as an ink-receiving layer. However, the superposition of a color filter layer on a gas barrier layer results in an increased heat load imposed on the gas barrier layer, so that the gas barrier layer is apt to yellow. In view of this, the resin sheet may be formed by a method in which a color filter layer, a gas barrier layer, and an epoxy resin layer are superposed in this order on a substrate coated with a hard coat layer. In the case where a color filter layer is superposed on a substrate coated with a hard coat layer, it is necessary to superpose an ink-receiving layer on the hard coat layer before a color filter layer is superposed thereon.

An electrode may be formed on the color filter-bearing resin sheet containing dispersed particles of the invention. Thus, an electrode-bearing resin sheet can be provided.

The electrode is preferably a transparent electrode film. The transparent electrode film can be formed from an appropriate material by a film deposition or coating technique used hitherto, such as vapor deposition, sputtering, or coating. Examples of the electrode material include indium oxide, tin oxide, indium-tin mixed oxide, gold, platinum, palladium, and transparent conductive coating materials. A transparent conductive film of a given electrode pattern can be directly formed. An alignment film for liquid crystal alignment may be optionally formed on the transparent conductive film by a technique used hitherto.

A liquid crystal display is generally fabricated, for example, by suitably assembling components including a polarizing film, a liquid crystal cell, a reflector or backlight, and optional optical parts and integrating an operating circuit into the assembly. In the invention, a liquid crystal display can be fabricated according to a procedure used hitherto without particular limitations, except that the color filter-bearing resin sheet containing dispersed particles described above is used. Consequently, appropriate optical parts can be suitably used in combination with the color filter-bearing resin sheet containing dispersed particles in fabricating the liquid crystal display according to the invention. For example, an antiglare layer, antireflection film, protective layer, or protective plate may be disposed over a viewing-side polarizing film. Furthermore, a retardation film for compensation may be interposed between the liquid crystal cell and the viewing-side polarizing film. From the standpoint of inhibiting or preventing viewing angle defects and shading, the resin sheet is more preferably disposed so that the diffuser-containing side or the diffuser-containing layer faces the inner side of the cell.

The resin sheet containing dispersed particles of the invention which has a reflecting layer or inorganic gas barrier layer can be obtained by forming a multilayer structure composed of a hard coat layer and an epoxy resin layer by flow casting, casting, or another technique, subsequently peeling the multilayer structure from the substrate, and then superposing a reflecting layer or an inorganic gas barrier layer thereon. Methods for forming the multilayer structure composed of a hard coat layer and an epoxy resin layer are not limited to flow casting and casting. For example, use may be made of a method in which a hard coat layer and an epoxy resin layer are formed on a substrate by an appropriate technique such as wire-wound bar coating, extrusion coating, gravure coating, or curtain coating, subsequently peeling the multilayer structure from the substrate, and then superposing a reflecting layer or an inorganic gas barrier layer thereon.

The resin sheet containing dispersed particles of the invention which has a color filter layer is most preferably produced through ink-jet printing in a flow casting process. However, methods for producing this resin sheet are not limited to this process. For example, use may be made of a method in which a hard coat layer, a gas barrier layer, and an epoxy resin layer are formed on a substrate by an appropriate technique such as wire-wound bar coating, extrusion coating, gravure coating, or curtain coating and a color filter layer is formed by an appropriate technique such as a pigment dispersion process or ink-jet printing. In this case, the color filter layer preferably is not an outermost layer.

Applications of the resin sheet containing dispersed particles of the invention which has a color filter layer are not limited to liquid crystal cell substrates, and the resin sheet can be advantageously used also as a substrate for electroluminescent displays. Especially in full-color electroluminescent displays, the resin sheet of the invention is useful because the luminescent spectrum for each of the R, G, and B colors has a broad peak and, hence, a color filter is necessary for improving the color purity.

In general, an organic electroluminescent device comprises a luminescent unit (organic electroluminescent unit) constituted of a transparent substrate and, superposed thereon in this order, a transparent electrode, an organic luminescent layer, and a metal electrode. The organic luminescent layer has a multilayer structure composed of thin organic films selected from various kinds, and various combinations of organic films are known. Examples thereof include a multilayer structure comprising a hole injection layer comprising a triphenylamine derivative and a luminescent layer comprising a fluorescent organic solid such as anthracene, a multilayer structure comprising such a luminescent layer and an electron injection layer comprising a perylene derivative, and a multilayer structure comprising such hole injection, luminescent, and electron injection layers.

The organic electroluminescent device luminesces based on the following principle. A voltage is applied between the transparent electrode and the metal electrode to thereby inject holes and electrons into the organic luminescent layer. The holes recombine with the electrons to generate an energy, which excites the fluorescent substance. This excited fluorescent substance emits a light upon recovery to the ground state. The mechanism of the recombination occurring during the luminescent process is the same as in general diodes. As can be presumed from this, the current and the luminescent intensity are highly nonlinear to the applied voltage, and the luminescence is accompanied by rectification.

In the organic electroluminescent device, at least one of the electrodes should be transparent in order to take out the light emitted by the organic luminescent layer. Usually, a transparent electrode made of a transparent conductor, e.g., indium-tin oxide (ITO), is used as the anode. On the other hand, for facilitating electron injection so as to heighten the luminous efficiency, it is important to use as the cathode a substance having a small work function. Usually, a metallic electrode made of, e.g., Mg—Ag or Al—Li is used.

The organic luminescent layer in the organic electroluminescent device having such a constitution is an exceedingly thin film having a thickness of about 10 nm. The organic luminescent layer hence transmits light almost completely like the transparent electrode. Because of this, a light incident on the device in the nonluminescent mode from the transparent-substrate side passes through the transparent electrode and the organic luminescent layer, is reflected by the metal electrode, and then reaches the front-side surface of the transparent substrate again. As a result, the display side of the organic electroluminescent device, when viewed from the outside, appears to be a mirror surface.

Such an organic electroluminescent device, which comprises an organic electroluminescent unit comprising an organic luminescent layer which luminesces upon voltage application, a transparent electrode disposed on the front side of the organic luminescent layer, and a metal electrode disposed on the back side of the organic luminescent layer, can be made to have a constitution including a polarizing film disposed on the front side of the transparent electrode and a retardation film interposed between the transparent electrode and the polarizing film.

The retardation film and the polarizing film function to polarize a light which has entered the device from the outside and has been reflected by the metal electrode. These films hence have the effect of preventing, based on the polarizing function, the mirror surface of the metal electrode from being perceived from the outside. In particular, when the retardation film is constituted of a quarter wavelength plate and the angle between the direction of polarization for the polarizing film and that for the retardation film is regulated to π/4, then the mirror surface of the metal electrode can be made completely invisible.

Specifically, when an external light strikes on this organic electroluminescent device, the polarizing film permits only the linearly polarized component of the light to pass therethrough. Although this linearly polarized light is generally converted to an elliptically polarized light by the retardation film, it is converted to a circularly polarized light when the retardation film is a quarter wavelength plate and the angle between the direction of polarization for the polarizing film and that for the retardation film is π/4.

This circularly polarized light passes through the transparent substrate, transparent electrode, and thin organic film, is reflected by the metal electrode, subsequently passes again through the thin organic film, transparent electrode, and transparent substrate, and is then reconverted to a linearly polarized light by the retardation film. Since this linearly polarized light has a direction of polarization which is perpendicular to that for the polarizing film, it cannot pass through the polarizing film. As a result, the mirror surface of the metal electrode can be made completely invisible.

The invention will be explained below in more detail by reference to Examples, but the invention should not be construed as being limited to these Examples in any way.

EXAMPLE 1

A hundred parts (parts by weight; the same applies hereinafter) of 3,4-epoxycyclohexylmethyl-3,4-epoxycyclohexanecarboxylate, represented by formula (1) and having a specific gravity of about 1.2, was mixed by stirring with 125 parts of methylhexahydrophthalic anhydride, represented by formula (2), 3.75 parts of tetra-n-butylphosphonium O,O-diethyl phosphorodithioate, represented by formula (3), 2.25 parts of glycerol, and 0.07 parts of a silicone surfactant. Into this mixture was incorporated 4 parts of alumina having a specific gravity of about 3.9 as a diffuser. Thus, a diffuser-containing epoxy resin liquid was prepared.

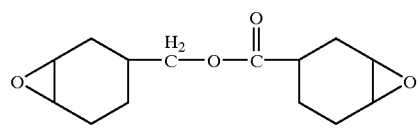

Formula (1)

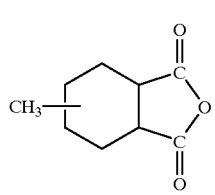

Formula (2)

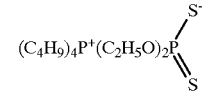

Formula (3)

Figure 4:
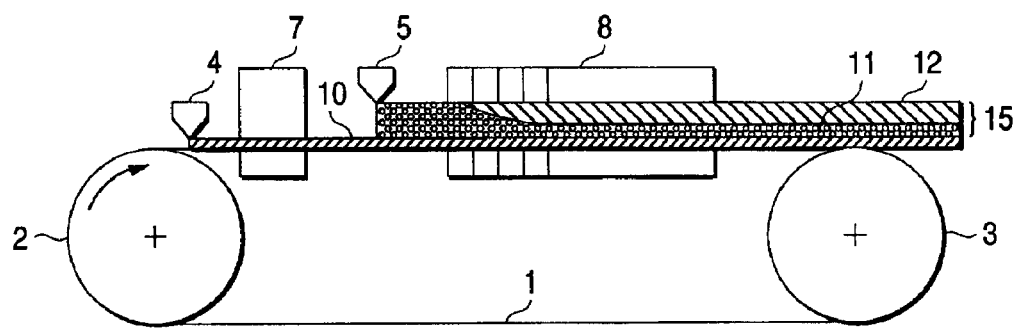
FIG. 4 is a diagrammatic view illustrating one embodiment of the processes of the invention for producing a resin sheet containing dispersed particles.

According to the process shown in FIG. 4, coating operations were conducted in the following manner. First, a 17% by weight toluene solution of the urethane acrylate represented by formula (4) was flow-cast on a stainless-steel endless belt 1 running at a speed of 0.3 m/min. The coating was air-dried to volatilize the toluene and then cured with a UV curing apparatus to form a hard coat layer 10 having a thickness of 2 μm. Subsequently, the diffuser-containing epoxy resin liquid was flow-cast through a die 5 on the hard coat layer at an endless-belt running speed of 0.3 m/min. The coating was cured with a heater to form an epoxy resin layer 15 having a thickness of 400 μm. The alumina contained in the epoxy resin liquid began to sediment immediately after application and finally localized mostly in a 50 μm-thick layer on the hard coat layer 10 side. Namely, the epoxy resin layer formed was composed of two parts, i.e., a diffuser-containing side 11 and a diffuser-free side 12.

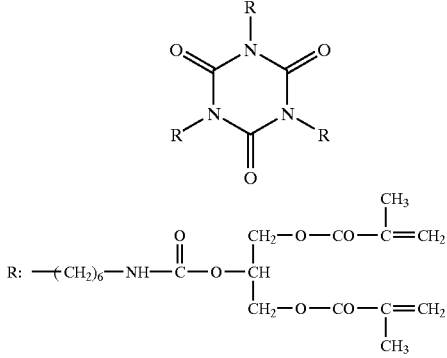

Formula (4)

The resulting multilayer structure composed of the hard coat layer and the epoxy resin layer was peeled from the endless belt. This structure was post-cured by being allowed to stand on a glass plate at 180° C. for 1 hour in an atmosphere having an oxygen concentration reduced to 0.5% by replacement with nitrogen.

Subsequently, a reflecting aluminum layer 19 having a thickness of 1,000 nm was formed on the epoxy resin layer side of the multilayer structure composed of the hard coat layer and the epoxy resin layer by vapor deposition at a vacuum of $6.7 \times 10^{-2}$ Pa and a deposition rate of 0.04 nm/sec.

EXAMPLE 2

A diffuser-containing epoxy resin liquid was prepared in the same manner as in Example 1. A diffuser-free epoxy resin liquid also was prepared in the same manner, except that alumina incorporation was omitted in the step of epoxy resin liquid preparation.

Figure 5:
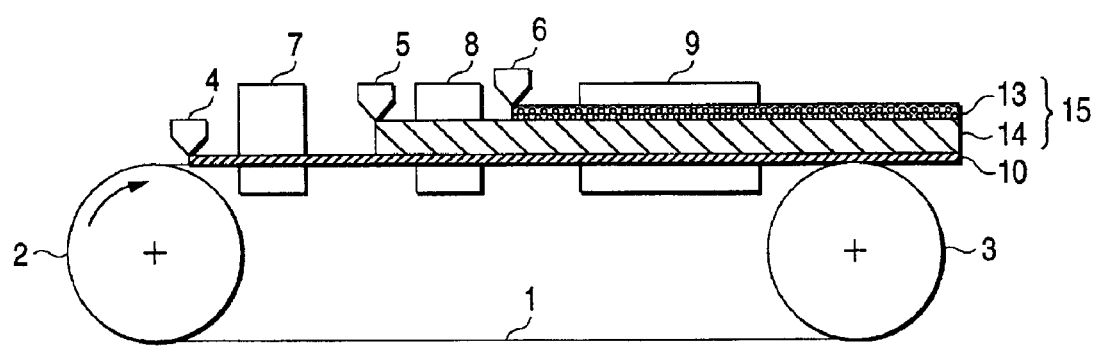
FIG. 5 is a diagrammatic view illustrating another embodiment of the processes of the invention for producing a resin sheet containing dispersed particles.

According to the process shown in FIG. 5, coating operations were conducted in the following manner. First, a hard coat layer 10 was formed in the same manner as in Example 1. Thereafter, the diffuser-free epoxy resin liquid was flow-cast through a die 5 at an endless-belt running speed of 0.3 m/min, and the coating was brought into a semi-cured state with a dryer 8 to form a diffuser-free layer. Subsequently, the diffuser-containing epoxy resin liquid was flow-cast through a die 6 at an endless-belt running speed of 0.3 m/min to form a diffuser-containing layer. The diffuser-free layer and the diffuser-containing layer were then completely cured with a dryer 9. In the resultant multilayer structure, the diffuser-free layer and the diffuser-containing layer had thicknesses of 350 μm and 50 μm, respectively.

The resultant multilayer structure composed of the hard coat layer, diffuser-free layer, and diffuser-containing layer was peeled from the endless belt. This structure was post-cured by being allowed to stand on a glass plate at 180° C. for 1 hour in an atmosphere having an oxygen concentration reduced to 0.5% by replacement by nitrogen. Subsequently, a reflecting aluminum layer having a thickness of 1,000 nm was formed on the diffuser-containing layer side of the multilayer structure by vapor deposition at a vacuum of $6.7 \times 10^{-2}$ Pa and a deposition rate of 0.04 nm/sec.

EXAMPLE 3

A multilayer structure composed of a hard coat layer and an epoxy resin layer was formed in the same manner as in Example 1. This multilayer structure was peeled from the endless belt and post-cured by being allowed to stand on a glass plate at 180° C. for 1 hour in an atmosphere having an oxygen concentration reduced to 0.5% by replacement with nitrogen.

Subsequently, the multilayer structure composed of the hard coat layer and the epoxy resin layer was placed in batch sputtering apparatus SMH-2306RE, manufactured by ULVAC Corp., and 30 cc of argon gas was introduced thereinto. On the epoxy resin layer side of the multilayer structure was deposited $SiO_x$(x=1.9) by conducting sputtering for 6 minutes and 20 seconds at a frequency of 500 Hz and a pressure of 0.4 Pa. Thus, an inorganic gas barrier layer 20 having a thickness of 100 nm was formed.

EXAMPLE 4

A multilayer structure composed of a hard coat layer, a diffuser-free layer, and a diffuser-containing layer was formed in the same manner as in Example 2. This multilayer structure was peeled from the endless belt and post-cured by being allowed to stand on a glass plate at 180° C. for 1 hour in an atmosphere having an oxygen concentration reduced to 0.5% by replacement with nitrogen.

Subsequently, an inorganic gas barrier layer having a thickness of 100 nm was formed on the diffuser-containing layer side of the multilayer structure in the same manner as in Example 3.

EXAMPLE 5

A hundred parts of UV-curable resin NK Oligo UN-01 (manufactured by Shin-Nakamura Chemical Co., Ltd.) was mixed by stirring with 3 parts of Irgacure #184 (manufactured by Ciba Specialty Chemicals) and 450 parts of toluene to obtain a resin solution for hard coat layer formation which had a solid concentration of 16%. Gohsenol NH-18 (manufactured by The Nippon Synthetic Chemical Industry Co., Ltd.) was dissolved in hot water to obtain a resin solution for gas barrier layer formation which had a solid concentration of 5.5%. Subsequently, a diffuser-containing epoxy resin liquid was prepared in the same manner as in Example 1.

A glass plate which had a surface roughness (Ra) of 0.2 nm and in which the ratio of the distance A1 between two points thereon as measured at 25° C. and 80% RH to the distance A0 between the two points as measured at 25° C. and 20% RH, i.e., the ratio A1/A0, was 1.00000 was coated with the resin solution for hard coat layer formation by means of a wire-wound bar. The coating was dried and then cured by UV irradiation to form a hard coat layer having a thickness of 2 μm. An aqueous poly(vinyl alcohol) solution was applied to the hard coat layer and dried to form an ink-receiving layer. Thereafter, colored resists respectively containing red, green, blue, and black (for matrix) pigments dispersed therein were applied to the ink-receiving layer to obtain a color filter layer by the pigment dispersion process. Examination of the color filter layer with a microscope revealed that the four colors of red, green, blue, and black had been accurately patterned without over lapping each other. The resin solution for gas barrier layer formation was applied to the color filter layer by extrusion coating and then dried at 100° C. for 10 minutes to form a gas barrier layer having a thickness of 2 μm. The diffuser-containing epoxy resin liquid was applied to the gas barrier layer by extrusion coating and then dried at 150° C. for 30 minutes to form an epoxy resin layer having a thickness of 400 μm. The alumina contained in the epoxy resin liquid began to sediment immediately after application and finally localized mostly in a 50 μm thick layer on the gas barrier layer side. Namely, the epoxy resin layer formed was composed of two parts, i.e., a diffuser-containing side and a diffuser-free side. After the epoxy resin layer was cured, the resultant multilayer structure composed of the hard coat layer, color filter layer, gas barrier layer, and epoxy resin layer was peeled from the glass plate. Thus, a resin sheet having a color filter was obtained.

EXAMPLE 6

A resin solution for hard coat layer formation and a resin solution for gas barrier layer formation were prepared in the same manner as in Example 5. A diffuser-containing epoxy resin liquid also was prepared in the same manner as in Example 1.

Figure 6:
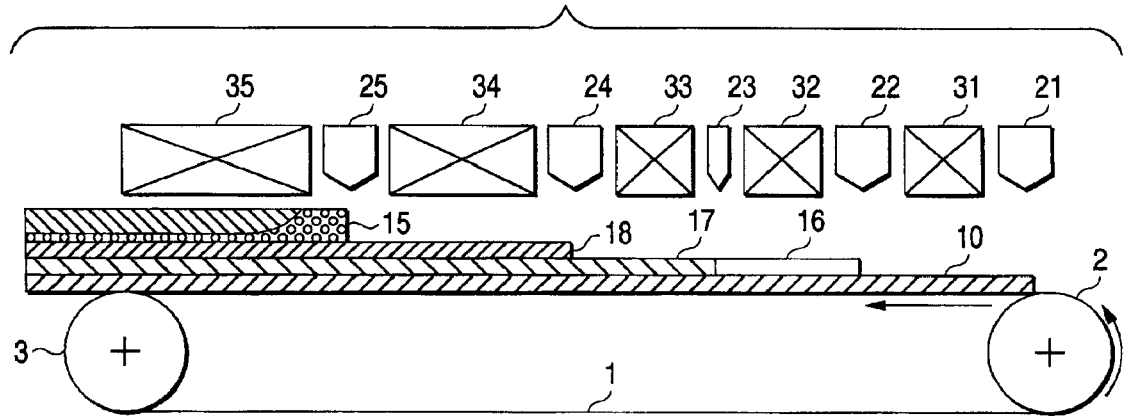
FIG. 6 is a diagrammatic view illustrating still another embodiment of the processes of the invention for producing a resin sheet containing dispersed particles.

Subsequently, a resin sheet having a color filter was produced by the flow casting process shown in FIG. 6 in the following manner. The resin solution for hard coat layer formation was applied through a die 21 to an endless steel belt 1 stretched between a driving drum 2 and a subsidiary drum 3. The coating was dried and then cured by UV irradiation to obtain a hard coat layer 10 having a thickness of 2 μm. The endless steel belt had a surface roughness (Ra) of 0.2 nm, and the ratio of the distance A1 between two points thereon as measured at 25° C. and 80% RH to the distance A0 between the two points as measured at 25° C. and 20% RH, i.e., the ratio A1/A0, was 1.00000.

Subsequently, an aqueous poly(vinyl alcohol) solution was applied through a die 22 and dried to form an ink-receiving layer 16. After a black matrix was formed, red, blue, and green inks were pattern-wise applied by ink-jet printing with an ink-jet apparatus 23 to form a color filter layer 17. Examination of the color filter layer with a microscope revealed that the four colors of red, blue, green, and black (for matrix) had been accurately patterned without overlapping each other. The resin solution for gas barrier layer formation was applied to the color filter layer through a die 24 and then dried at 100° C. for 10 minutes to form a gas barrier layer 18 having a thickness of 2 $\mu$m. The diffuser-containing epoxy resin liquid was applied to the gas barrier layer through a die 25. The alumina contained in the epoxy resin liquid began to sediment immediately after application and finally localized mostly in a 50 $\mu$m thick layer on the gas barrier layer side. Namely, the epoxy resin layer formed was composed of two parts, i.e., a diffuser-containing side and a diffuser-free side. After the epoxy resin layer was cured, the resultant multilayer structure composed of the hard coat layer, color filter layer, gas barrier layer, and epoxy resin layer was peeled from the endless steel belt. Thus, a resin sheet having a color filter was obtained.

EXAMPLE 7

A resin solution for hard coat layer formation and a resin solution for gas barrier layer formation were prepared in the same manner as in Example 5. A diffuser-containing epoxy resin liquid also was prepared in the same manner as in Example 1. Furthermore, a diffuser-free epoxy resin liquid was prepared in the same manner, except that diffuser incorporation was omitted in the epoxy resin liquid preparation.

Figure 7:
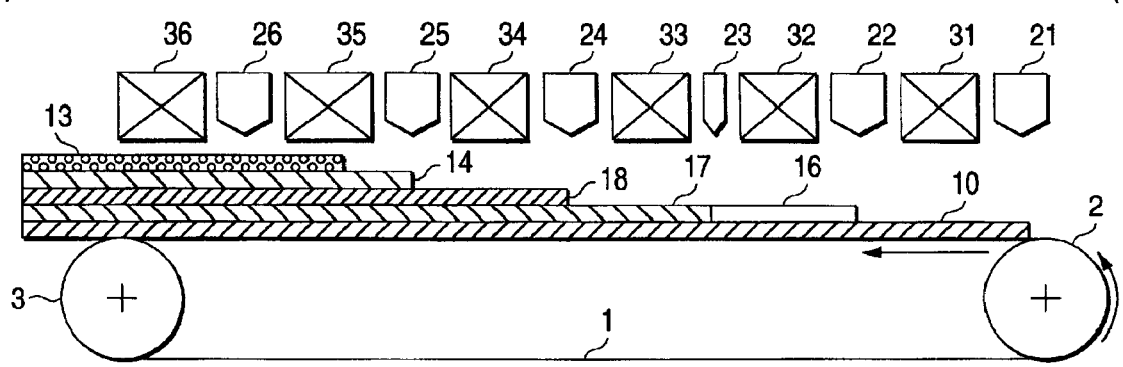
FIG. 7 is a diagrammatic view illustrating a further embodiment of the processes of the invention for producing a resin sheet containing dispersed particles.

Subsequently, a hard coat layer, a color filter layer, and a gas barrier layer were formed by the flow casting process shown in FIG. 7 in the same manner as in Example 6. The diffuser-free epoxy resin liquid was then applied through a die 25 to form a diffuser-free layer 14, which was brought into a semi-cured state. Thereafter, the diffuser-containing epoxy resin liquid was applied through a die 26 to form a diffuser-containing layer 13. The diffuser-containing layer and the diffuser-free layer were completely cured. Thereafter, the resultant multilayer structure composed of the hard coat layer, color filter layer, gas barrier layer, diffuser-free layer, and diffuser-containing layer was peeled from the endless steel belt. Thus, a resin sheet having a color filter was obtained.

Comparative Example 1

First, a 17% by weight toluene solution of the urethane acrylate was flow-cast on a stainless-steel endless belt running at a speed of 0.3 m/min. The coating was air-dried to volatilize the toluene and then cured with a UV curing apparatus to form a hard coat layer having a thickness of 2 $\mu$m. Subsequently, a 5.5% by weight aqueous solution of a poly(vinyl alcohol) resin was flow-cast on the hard coat layer at an endless-belt running speed of 0.3 m/min. The coating was dried at 100° C. for 10 minutes to form an organic gas barrier layer having a thickness of 3.7 $\mu$m. The diffuser-free epoxy resin liquid prepared in Example 2 was then flow-cast on the organic gas barrier layer at an endless-belt running speed of 0.3 m/min. This coating was cured with a heater to form an epoxy resin layer having a thickness of 400 $\mu$m.

The resultant multilayer structure composed of the hard coat layer, organic gas barrier layer, and epoxy resin layer was peeled from the endless belt. This structure was post-cured by being allowed to stand on a glass plate at 180° C. for 1 hour in an atmosphere having an oxygen concentration reduced to 0.5% by replacement with nitrogen.

Subsequently, a reflecting aluminum layer having a thickness of 1,000 nm was formed by vapor deposition on the epoxy resin layer side of the multilayer structure composed of the hard coat layer, organic gas barrier layer, and epoxy resin layer.

Comparative Example 2

First, a 17% by weight toluene solution of the urethane acrylate was flow-cast on a stainless-steel endless belt running at a speed of 0.3 m/min. The coating was air-dried to volatilize the toluene and then cured with a UV curing apparatus to form a hard coat layer having a thickness of 2 $\mu$m. Subsequently, a 5.5% by weight aqueous solution of a poly(vinyl alcohol) resin was flow-cast on the hard coat layer at an endless-belt running speed of 0.3 m/min. The coating was dried at 100° C. for 10 minutes to form an organic gas barrier layer having a thickness of 3.7 $\mu$m. The diffuser-free epoxy resin liquid prepared in Example 2 was then flow-cast on the organic gas barrier layer at an endless-belt running speed of 0.3 m/min. This coating was cured with a heater to form an epoxy resin layer having a thickness of 400 $\mu$m.

The resulting multilayer structure composed of the hard coat layer, organic gas barrier layer, and epoxy resin layer was peeled from the endless belt. This structure was post-cured by being allowed to stand on a glass plate at 180° C. for 1 hour in an atmosphere having an oxygen concentration reduced to 0.5% by replacement with nitrogen.

Comparative Example 3

A resin solution for hard coat layer formation and a resin solution for gas barrier layer formation were obtained in the same manner as in Example5. Subsequently, a diffuser-free epoxy resin liquid was obtained in the same manner as described above, except that diffuser incorporation was omitted in the epoxy resin liquid preparation. The resin solution for hard coat layer formation was applied to a glass plate with a wire-wound bar. The coating was dried and then cured by UV irradiation to obtain a hard coat layer having a thickness of 2 $\mu$m. The resin solution for gas barrier layer formation was applied to the hard coat layer by extrusion coating and dried at 100° C. for 10 minutes to obtain a gas barrier layer having a thickness of 2 $\mu$m. The diffuser-free epoxy resin liquid was applied to the gas barrier layer by extrusion coating and dried at 150° C. for 30 minutes to form an epoxy resin layer having a thickness of 400 $\mu$m. The resultant multilayer structure composed of the hard coat layer, gas barrier layer, and epoxy resin layer was peeled from the glass plate. Subsequently, colored resists respectively containing red, green, blue, and black (for matrix) pigments dispersed therein were applied in stripes to the multilayer structure by the pigment dispersion process in an attempt to form a color filter layer. However, the multilayer structure showed a considerable dimensional change and, hence, positioning was impossible.

Evaluation Test

Oxygen permeability (cc/m$^2$·24 h·atm), yellowness index (YI), moisture permeability (g/m$^2$·24 h·atm), and display quality:

Oxygen permeability was determined through a measurement with OX-TRAN TWIN, manufactured by Modern Controls Inc., by the oxirant method under the conditions of 40° C. and 43% RH.

Yellowness index (YI) was determined with CMS-500, manufactured by Murakami Shikisai, in accordance with JIS K-7103 using a platy sample having dimensions of 30×50 mm.

Moisture permeability was determined with a cup for moisture permeability measurement and accessories in accordance with JIS Z-0208.

Furthermore, the liquid crystal cell substrates produced in Examples 1 to 7 and Comparative Examples 1 and 2 were used to fabricate liquid crystal displays. In a dark room, the liquid crystal displays were illuminated with a ring-shaped illuminator at an angle of 20°. Under these conditions, each liquid crystal display was examined for the display quality of a black picture while applying a voltage thereto, and was further examined for the display quality of a white picture while applying no voltage thereto. The liquid crystal displays were ranked in display quality based on the following criteria.

A: The pictures were inhibited from assuming a yellowish tint and the white picture was inhibited from glittering.

B: The pictures were inhibited from assuming a yellowish tint but the white picture glittered in such a degree that the display was practically usable.

C: The white picture was inhibited from glittering but assumed a yellowish tint in such a degree that the display was practically usable.

D: The pictures assumed a yellowish tint in such a degree that the display was practically usable, and the white picture glittered in such a degree that the display was practically usable.

The results of the evaluations are shown in Table 1.

TABLE 1

| | Yellowness index change | Oxygen permeability* | Moisture permeability* | Display quality | Comprehensive evaluation |
|---|---|---|---|---|---|
| Example 1 | 0.58 | 0.04 | 4.8 | A | ○ |
| Example 2 | 0.58 | 0.04 | 4.8 | A | ○ |
| Example 3 | 0.58 | 0.04 | 4.8 | A | ○ |
| Example 4 | 0.58 | 0.04 | 4.8 | A | ○ |
| Example 5 | 0.91 | 0.14 | 24.0 | C | ○ |
| Example 6 | 0.91 | 0.14 | 24.0 | C | ○ |
| Example 7 | 0.91 | 0.14 | 24.0 | C | ○ |
| Comparative Example 1 | 0.91 | 0.04 | 4.8 | D | X |
| Comparative Example 2 | 0.91 | 0.14 | 24.0 | D | X |

*Oxygen permeability (cc/m$^2$ · 24 h · atm)
*Moisture permeability (g/m$^2$ · 24 h · atm)

The liquid crystal cell substrates obtained in Examples 1 to 4 were used to fabricate liquid crystal displays. As a result, the displays had satisfactory reliability in weathering. In these displays, the pictures were inhibited from assuming a yellowish tint and the white picture was inhibited from glittering.

The liquid crystal cell substrates obtained in Examples 5 to 7 were used to fabricate liquid crystal displays. As a result, these displays had such a level of reliability in weathering that they were practically usable, although the weathering reliability was lower than that of the displays of Examples 1 to 4. With respect to display quality, the white picture was inhibited from glittering but assumed a yellowish tint in such a degree that the displays were practically usable.

The liquid crystal cell substrate obtained in Comparative Example 1 was used to fabricate a liquid crystal display. As a result, the display had satisfactory reliability in weathering. With respect to display quality, the pictures assumed a yellowish tint in such a degree that the display was practically usable, and the white picture glittered in such a degree that the display was practically usable.

The liquid crystal cell substrate obtained in Comparative Example 2 was used to fabricate a liquid crystal display. As a result, the display had such a level of reliability in weathering that it was practically usable, although the weathering reliability was lower than that of the displays of Examples 1 to 4. With respect to display quality, the pictures assumed a yellowish tint in such a degree that the display was practically usable, and the white picture glittered in such a degree that the display was practically usable.

Since the resin sheets containing dispersed particles of the invention are resin-based sheets, they are thin and lightweight and have excellent mechanical strength. Due to the incorporation of a diffuser in the epoxy resin layer, a liquid crystal cell can be produced which has a light-diffusing layer in a position close to the liquid crystal layer. Consequently, the image blurring caused by viewing angle differences or by shading can be prevented and visibility can be greatly improved.

Furthermore, the resin sheet containing dispersed particles of the invention which has a reflecting layer or inorganic gas barrier layer is characterized by having a satisfactory gas barrier function, a small yellowness index change, and excellent heat resistance.

Moreover, the processes of the invention for producing a resin sheet having a color filter do not include a step in which a multilayer structure comprising a hard coat layer, gas barrier layer, and epoxy resin layer is peeled from the substrate before a color filter layer is superposed thereon. Because of this, position shifting is less apt to occur in the patterning for color filter formation, and a color filter-bearing resin sheet containing dispersed particles can be efficiently obtained with high accuracy.

What is claimed is:

1. A resin sheet for use in a liquid crystal display, close to a liquid crystal layer; the resin sheet comprising a hard coat layer, a base layer, and a reflecting layer, in that order; the reflecting layer comprises a thin metal layer; the base layer comprises an epoxy resin layer comprising 100 parts by weight of an epoxy resin and up to 200 parts by weight of a diffuser having a refractive index different from that of the epoxy resin and having an average particle diameter of from 0.2 to 100 μm, wherein the diffuser localizes so as to have a concentration distribution in the direction of the thickness of the epoxy resin layer, and wherein the localization distributes the diffuser only in a region close to the liquid crystal layer, whereby a light-diffusing function is imparted to improve visibility.

2. The resin sheet of claim 1, wherein the epoxy resin layer consists of a single layer or comprises superposed layers comprising a diffuser-containing layer and a diffuser-free layer adhered thereto.

3. The resin sheet of claim 1, wherein the epoxy resin layer is an outermost layer and the diffuser localizes on the outermost side of the epoxy resin layer, the outermost-side surface of the epoxy resin layer being smooth.

4. The resin sheet of claim 1, wherein the difference in refractive index between the diffuser and the epoxy resin is from 0.03 to 0.10.

5. The resin sheet of claim 1, which has an oxygen permeability of 0.3 cc/m²·24 h·atm or lower.

6. A liquid crystal display which uses the resin sheet of claim 1.

7. A resin sheet for use in a liquid crystal display, close to a liquid crystal layer; the resin sheet comprising, a hard coat layer, a base layer, and an inorganic gas barrier layer, in that order; the base layer comprises an epoxy resin layer comprising 100 parts by weight of an epoxy resin and up to 200 parts by weight of a diffuser having a refractive index different from that of the epoxy resin and having an average particle diameter of from 0.2 to 100 μm, wherein the diffuser localizes so as to have a concentration distribution in the direction of the thickness of the epoxy resin layer, and wherein the localization distributes the diffuser only in a region close to the liquid crystal layer, whereby a light-diffusing function is imparted to improve visibility.

8. The resin sheet of claim 7, wherein the epoxy resin layer consists of a single layer or comprises superposed layers comprising a diffuser-containing layer and a diffuser-free layer adhered thereto.

9. The resin sheet of claim 7, wherein the epoxy resin layer is an outermost layer and the diffuser localizes on the outermost side of the epoxy resin layer, the outermost-side surface of the epoxy resin layer being smooth.

10. The resin sheet of claim 7, wherein the difference in refractive index between the diffuser and the epoxy resin is from 0.03 to 0.10.

11. The resin sheet of claim 7, wherein the inorganic gas barrier layer comprises a silicon oxide in which the ratio of the number of oxygen atoms to that of silicon atoms is from 1.5 to 2.0.

12. The resin sheet of claim 7, wherein the inorganic gas barrier layer comprises a silicon nitride in which the ratio of the number of nitrogen atoms to that of silicon atoms is from 1.0 to 4/3.

13. The resin sheet of claim 7, wherein the inorganic gas barrier layer has a thickness of from 5 to 200 nm.

14. The resin sheet of claim 7, which has a moisture permeability of 10 g/m²·24 h·atm or lower.

15. A liquid crystal display which uses the resin sheet of claim 7.

16. A resin sheet for use in a liquid crystal display, close to a liquid crystal layer; the resin sheet comprising a hard coat layer, a color filter layer, a gas barrier layer, and a base layer, in that order; the base layer comprises an epoxy resin layer comprising 100 parts by weight of an epoxy resin and up to 200 parts by weight of a diffuser having a refractive index different from that of the epoxy resin and having an average particle diameter of from 0.2 to 100 μm, wherein the diffuser localizes so as to have a concentration distribution in the direction of the thickness of the expoxy resin layer, and wherein the localization distributes the diffuser only in a region close to the liquid crystal layer, whereby a light-diffusing function is imparted to improve visibility.

17. The resin sheet of claim 16, wherein the epoxy resin layer consists of a single layer or comprises superposed layers comprising a diffuser-containing layer and a diffuser-free layer adherent thereto.

18. The resin sheet of claim 16, wherein the epoxy resin layer is an outermost layer and the diffuser localizes on the outermost side of the epoxy resin layer, the outermost-side surface of the epoxy resin layer being smooth.

19. The resin sheet of claim 16, wherein the difference in refractive index between the diffuser and the epoxy resin is from 0.03 to 0.10.

20. A liquid crystal display which uses the resin sheet of claim 16.

* * * * *